Aug. 30, 1960    J. L. FRENCH    2,950,550
BULLDOZER

Filed May 26, 1959    2 Sheets-Sheet 1

INVENTOR.
J.L. FRENCH

ATTORNEYS

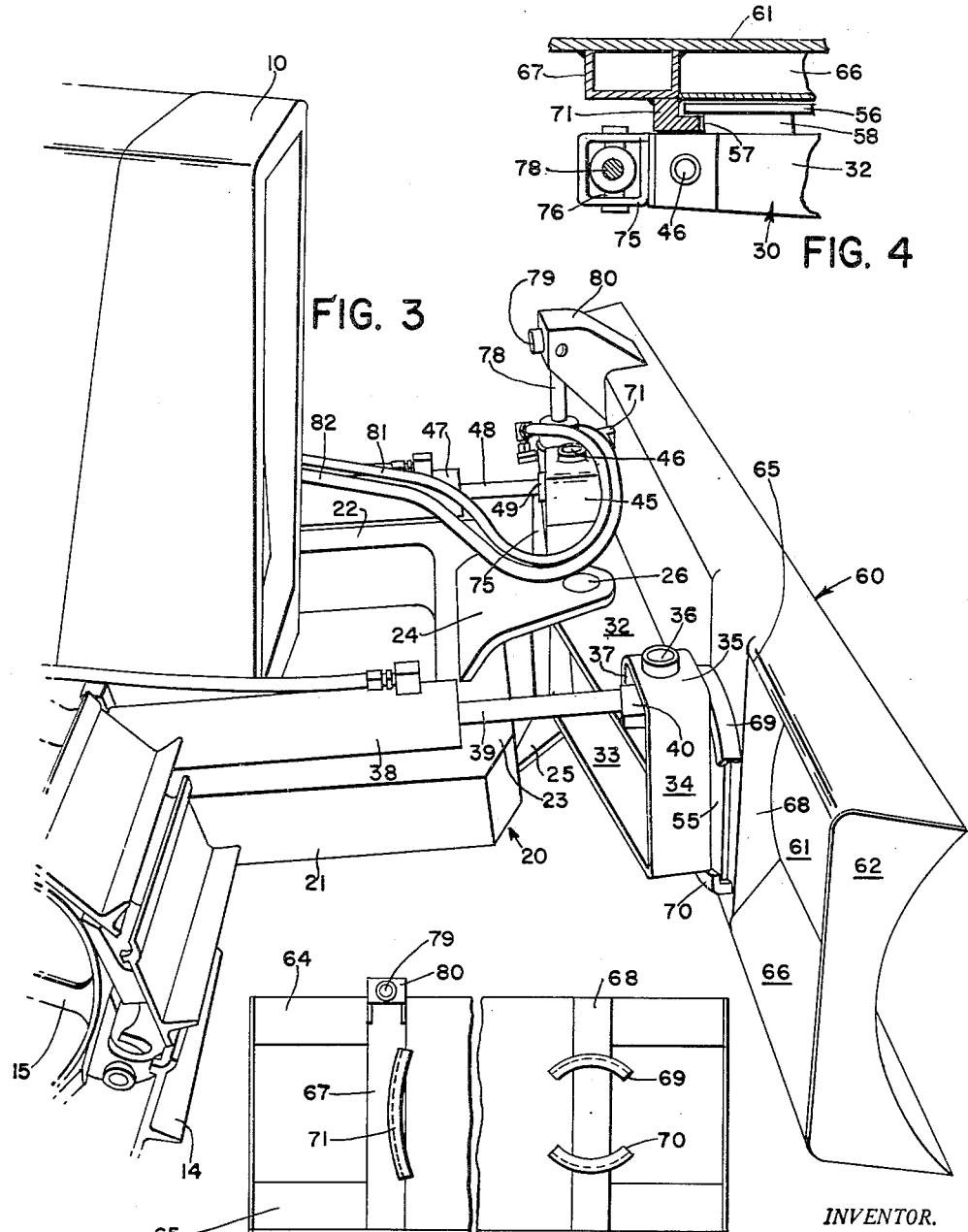

2,950,550
BULLDOZER

John L. French, Moline, Ill., assignor to Deere & Company, Moline, Ill., a corporation of Delaware Filed May 26, 1959, Ser. No. 815,854

6 Claims. (Cl. 37—144)

This invention relates to an earth working implement of a bulldozer type. More particularly this invention relates to a structure for mounting the bulldozer blade on its supporting arms.

In the conventional type bulldozer there is normally provided a U-shaped main frame which has the legs of the frame positioned on opposite sides of the tractor body and pivotally mounted to the body at their rear ends. The bight portion of the U-shaped frame extends around the forward end of the tractor. Generally, there is provided on the bight portion of the main frame means for connection to a forwardly disposed bulldozer blade, the latter means including some type of adjustment for angle-dozing the blade and in some instances a generally crude method of tilting the blade about an horizontal fore-and-aft extending axis.

It is the main purpose of the present invention to provide a new and novel method of mounting a blade on the conventional U-shaped main frame which includes an intermediate or blade supporting frame which may be mounted to swing about a vertical axis relative to the main U-shaped frame. The intermediate or blade supporting frame will be further connected to the main frame of the dozer by means of fore-and-aft extending hydraulic units which will operate to angle the blade supporting frame to swing about the vertical axis.

The intermediate frame will be connected directly to the bulldozer blade by having at one end thereof structure forming an horizontal fore-and-aft pivot so that the blade may tilt about the pivot axis and having at the opposite end thereof a vertically disposed hydraulic unit which will effect adjustable tilting of the blade about the aforesaid horizontal axis. Other advantages of the invention will become apparent to those skilled in the art as the nature of the invention is better understood from the following disclosure and as shown in the accompanying drawings.

Fig. 3 is a side perspective view of the bulldozer similar to Fig. 2 but viewing the dozer and the associated frame from the opposite side of the tractor.

Fig. 4 is a sectional view taken substantially along the line 4—4 of Fig. 2.

Fig. 5 is a rear view of the bulldozer blade.

Figure 1:
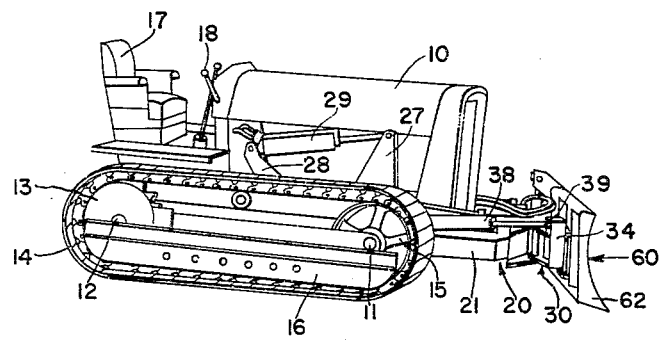
Fig. 1 is a side perspective view of a tractor and bulldozer assembly incorporating the principles of the present invention.
Figure 2:
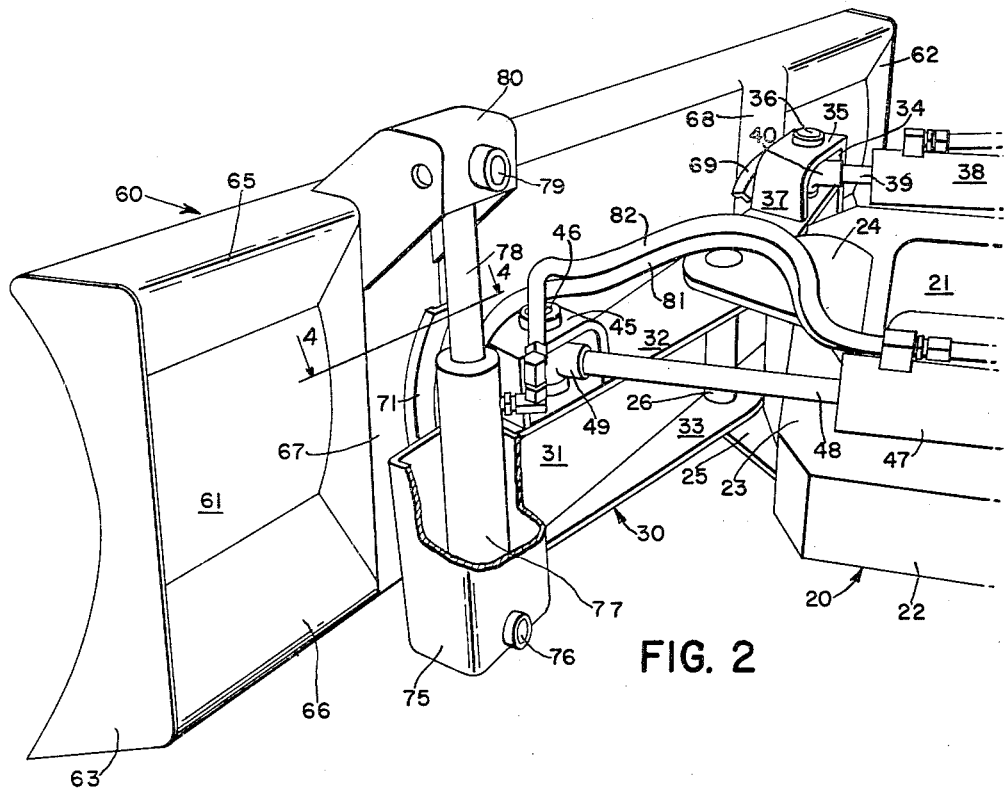
Fig. 2 is an enlarged side perspective view looking into the rear portion of the bulldozer blade and the forward portion of the supporting frame.

Referring to Fig. 1, the tractor is composed of a fore-and-aft extending elongated body 10 supported on front and rear axles 11, 12 respectively. On the right end of the rear axle 12 is a track driving sprocket 13 over which is mounted a track 14. The forward end of the track extends over an idler sprocket 15 journaled on the right end of the front axle 11. Track rollers, not shown, are mounted on the tractor behind a roller shield 16 and operate to maintain the track 14 in engagement with the ground. The left side of the tractor which is not shown is supported in similar manner. An operator's station, as indicated by the tractor seat 17, is provided on the tractor body 10 and has adjacent thereto a series of levers, such as at 18, which controls the operation of the tractor as well as the positioning of the bulldozer structure.

The bulldozer is composed of a U-shaped main frame, indicated in its entirety by the reference numeral 20 having opposite arms or leg portions 21, 22 positioned on opposite sides of the tractor body 10 and pivotally mounted at their rear ends to the tractor body to permit the main frame 20 to be adjusted vertically. The forward ends of the arm portions 21, 22 are interconnected by a rigid bight portion 23 which is disposed transversely relative to the tractor and positioned forwardly of the tractor body 10. Projecting forwardly from the transverse or bight portion 23 are upper and lower brackets 24, 25 respectively which support a vertical pivot pin 26.

Upright brackets 27, 28 are fixed to the arm portion 21 and the tractor body 10 respectively. An hydraulic unit 29 bridges the space between the upper ends of the brackets 27, 28 and effects raising and lowering of the frame 20 about its rear pivotal connections. A similar hydraulic lift system, not shown, is provided on the opposite or left side of the tractor.

Disposed forwardly of the bight portion 23 is a transverse blade supporting frame 30 composed of a front wall section 31 and upper and lower horizontal flanges 32, 33. The flanges 32, 33 extend rearwardly from the front wall 31 and are provided with openings to receive the pivot pin 26. Opposite ends of the frame 30 are positioned outwardly from the pivot pin 26 and are positioned generally forwardly of the side arms 21, 22. The right end of the transverse frame 30 is formed by a vertical continuation 34 of the lower flange 33 which extends upwardly beyond the upper flange 32 and has a horizontally disposed overlying section 35 in which is fixed a vertically disposed pivot pin 36. The overlying section 35 turns downwardly at 37 and is welded at its lower edge to the upper surface of the upper flange 32. An hydraulic assembly including an hydraulic cylinder 38 and a forwardly extending piston rod 39 extends between the arm 21 and the pin 36, a suitable coupling element 40 being provided to connect the rod 39 to the pin 36.

On the left end of the transverse frame 30 and disposed substantially forwardly of the left arm 22 is a U-shaped bracket 45 having depending legs welded to the upper surface of the upper flange 32. The bight portion of the bracket 45 supports a vertical pivot pin 46 which also extends through the upper flange 32. Mounted on the left arm 22 is an hydraulic assembly including a cylinder 47 and a forwardly projecting piston rod 48 which has its forward end connected to the pivot pin 46 by means of a coupling element 49. As becomes obvious from viewing the drawings, the transverse frame is controlled for angling relative to the main frame 20 by means of extending or retracting the piston rods 39, 48 within their respective cylinders 38, 47.

Fixed to the right end on the transverse supporting member 30 is an upright forwardly facing plate member 55 having upper and lower rounded or arcuate edges formed about a common horizontally disposed axis. The upper and lower edges of the plate 55 extend above and below the upper and lower flanges 32, 33. The plate is welded or otherwise fixed to the forward wall 31 of the transverse member. Adjacent the left end of the transverse member 30 and also fixed to the upright wall 31 is a forwardly facing upright plate 56. A spacer plate 58 is provided between the plate 56 and wall 31 to and inwardly of the plate 56 to provide a slot indicated at 57.

The bulldozer blade, indicated in its entirety by the reference numeral 60, is composed of a forwardly facing blade section or moldboard 61 having transversely spaced end plates 62, 63. Reinforcing the blade or moldboard 61 is webbing structure in the form of upper and lower tubular structures 65, 66 and left- and right-hand upright truss sections 67, 68 disposed forwardly of opposite ends of the transverse support member or frame 30. Fixed to the rear face of the right end truss 68 are a pair of vertically spaced apart tracks 69, 70 which are arcuate-shaped and are disposed to overlie and generally grip the upper and lower edges of the plate 55 fixed to the right end of the transverse support member 30. Fixed to the left truss 67 is a track 71 which is substantially L-shaped and is positioned relative to the left end of the transverse supporting member 30 so that the track 71 is seated in the slot 57 and behind the plate member 56. The track 71 is arcuate in shape and is formed about a radius extending from the fore-and-aft extending longitudinal axes about which the arcuate sections 69, 70 are formed. Viewing Fig. 4, therefore, it becomes apparent that the entire bulldozer blade 60 may swing vertically about the horizontal axis of the plate 55 and the tracks 69, 70 and 71 will operate as guides permitting the tilting action.

The forward plate member 31 continues outwardly at its left outer end and is formed into a vertically disposed U-shaped supporting column 75 which extends back against the inner face of the plate member to form an upright enclosure open at the upper and lower end and supporting at its lower end a fore-and-aft extending horizontal pivot pin 76. The pivot pin 76 has mounted thereon an upwardly projecting hydraulic assembly including a cylinder 77 and piston rod 78, the upper end of the latter being connected to a second fore-and-aft extending horizontal pivot pin 79 contained in a suitable bracket structure 80 projecting rearwardly from the upper webbing 65 and truss member 67. A suitable coupling, which is not shown, connects the pin 79 to the piston rods 78. Suitable hydraulic hoses 81, 82 extending from conventional type valve means on the tractor are provided to operate the piston and cylinder 77, 78.

Viewing the drawings, it becomes apparent that the bulldozer blade will pivot about the axis of the upright plate 55 at one end of the supporting frame 30 and the hydraulic assembly composed of the cylinder 77 and piston rod 78 which is fixed to the opposite end of the supporting frame 30 will effect movement of the bulldozer blade 60 about the aforesaid horizontal axis. The tracks 69, 70, and 71 will prevent separation of the supporting frame 30 and the bulldozer blade 60.

While only one form of the invention has been shown, it should be recognized that other forms and variations will occur to those skilled in the art. Therefore, while the present disclosure was shown and described in detail for purposes of completely and concisely illustrating the principles of the invention, it was not the intention to so limit or narrow the invention beyond the broad concepts set forth in the appended claims.

What is claimed is:

1. An earth moving implement for a tractor comprising: a U-shaped main frame having fore-and-aft extending side portions pivotally mounted at their rear ends on the tractor and a forward transverse portion disposed forwardly of the tractor interconnecting the forward ends of the side portions; structure defining a vertical pivot on the transverse portion intermediate the side portions; a transverse blade supporting frame mounted on the vertical pivot and having opposite ends disposed outwardly of the pivot; an extensible hydraulic actuated piston and cylinder assembly extending from a side portion to one end of the transverse blade supporting frame for effecting movement of the latter about the vertical pivot; a forwardly facing plate member having arcuate edges formed about a horizontal axis fixed to one end of the transverse blade supporting frame; a bulldozer blade disposed forwardly of and adjacent to the blade supporting frame and having arcuate-shaped hook elements adapted to overlie the edges of the forwardly facing plate member for permitting tilting of the blade about the aforesaid horizontal axis while preventing separation of the blade and supporting frame; an arcuate track rigid with the bulldozer blade formed about the horizontal axis and disposed proximate the opposite end of the blade supporting frame; track engaging means on the opposite end of the blade supporting frame for preventing separation of the track and supporting frame while permitting tilting of the blade about said axis; and a hydraulic actuated cylinder and piston assembly disposed in and operable in a vertical plane between the opposite end of the supporting frame and the bulldozer blade for effecting tilting adjustment of the blade relative to the blade supporting frame.

2. An earth moving implement for a tractor comprising: a U-shaped main frame having fore-and-aft extending side portions pivotally mounted at their rear ends on the tractor and a forward transverse portion disposed forwardly of the tractor interconnecting the forward ends of the side portions; structure defining a vertical pivot on the transverse portion intermediate the side portions; a transverse blade supporting frame mounted on the vertical pivot and having opposite ends disposed outwardly of the pivot; an extensible hydraulic actuated piston and cylinder assembly extending from a side portion to one end of the transverse blade supporting frame for effecting movement of the latter about the vertical pivot; structure on one end of the supporting frame defining a pivot about a horizontal axis; a bulldozer blade disposed forwardly of and adjacent to the blade supporting frame supported on the pivot for permitting tilting of the blade about the aforesaid horizontal axis while preventing separation of the blade and supporting frame; an arcuate track rigid with the bulldozer blade formed about the horizontal axis and disposed proximate the opposite end of the blade supporting frame; track engaging means on the opposite end of the blade supporting frame for preventing separation of the track and supporting frame while permitting tilting of the blade about said axis; and a hydraulic actuated cylinder and piston assembly disposed in and operable in a vertical plane between the opposite end of the supporting frame and the bulldozer blade for effecting tilting adjustment of the blade relative to said one end of the blade supporting frame.

3. An earth moving implement for a tractor comprising: a U-shaped main frame having fore-and-aft extending side portions pivotally mounted at their rear ends on the tractor and a forward transverse portion disposed forwardly of the tractor interconnecting the forward ends of the side portions; structure defining a vertical pivot on the transverse portion intermediate the side portions; a transverse blade supporting frame mounted on the vertical pivot and having opposite ends disposed outwardly of the pivot; an extensible hydraulic actuated piston and cylinder assembly extending from a side portion to one end of the transverse blade supporting frame for effecting movement of the latter about the vertical pivot; structure on one end of the supporting frame defining a pivot about a horizontal axis; a bulldozer blade disposed forwardly of and adjacent to the blade supporting frame supported on the pivot for permitting tilting of the blade about the aforesaid horizontal axis while preventing separation of the blade and supporting frame; and a hydraulic actuated cylinder and piston assembly disposed in and operable in a vertical plane between the opposite end of the supporting frame and the bulldozer blade for effecting tilting adjustment of the blade relative to said horizontal axis at said one end of the blade supporting frame.

4. An earth moving implement for a tractor comprising: a U-shaped main frame having fore-and-aft extending side portions pivotally mounted at their rear ends on the tractor and a forward transverse portion disposed forwardly of the tractor interconnecting the forward ends of the side portions; structure defining a vertical pivot on the transverse portion intermediate the side portions; a transverse blade supporting frame mounted on the vertical pivot and having opposite ends disposed outwardly of the pivot; an extensible hydraulic actuated piston and cylinder assembly extending from a side portion to one end of the transverse blade supporting frame for effecting movement of the latter about the vertical pivot; forwardly extending structure defining a horizontal pivot fixed to one end of the transverse blade supporting frame; a bulldozer blade disposed forwardly of and adjacent to the blade supporting frame and pivotally mounted on the horizontal pivot; and a hydraulic actuated cylinder and piston assembly disposed in and operable in a vertical plane between the opposite end of the supporting frame and the bulldozer blade for effecting tilting adjustment of the blade relative to the blade supporting frame.

5. An earth moving implement for a tractor comprising: a U-shaped main frame having fore-and-aft extending side portions pivotally mounted at their rear ends on the tractor and a forward transverse portion disposed forwardly of the tractor interconnecting the forward ends of the side portions; structure defining a vertical pivot on the transverse portion intermediate the side portions; a transverse blade supporting frame mounted on the vertical pivot and having opposite ends disposed outwardly of the pivot; an extensible hydraulic actuated piston and cylinder assembly extending from a side portion to one end of the transverse blade supporting frame for effecting movement of the latter about the vertical pivot; forwardly extending structure defining a horizontal pivot fixed to one end of the transverse blade supporting frame; a bulldozer blade disposed forwardly of and adjacent to the blade supporting frame and pivotally mounted on the horizontal pivot for permitting tilting of the blade; an arcuate track rigid with the bulldozer blade formed about the axis of the horizontal pivot and disposed proximate the opposite end of the blade supporting frame; track engaging means on the opposite end of the blade supporting frame for preventing separation of the track and supporting frame while permitting tilting of the blade about said axis; and a hydraulic actuated cylinder and piston assembly disposed in and operable in a vertical plane between the opposite end of the supporting frame and the bulldozer blade for effecting tilting adjustment of the blade relative to the blade supporting frame.

6. An earth moving implement for a tractor comprising: a U-shaped main frame having fore-and-aft extending side portions pivotally mounted at their rear ends on the tractor and a forward transverse portion disposed forwardly of the tractor interconnecting the forward ends of the side portions; a transverse blade supporting frame mounted on the main frame and having opposite ends disposed outwardly of the tractor; a forwardly facing plate member having arcuate edges formed about a horizontal axis fixed to one end of the transverse blade supporting frame; a bulldozer blade disposed forwardly of and adjacent to the blade supporting frame and having arcuate-shaped track elements adapted to overlie the edges of the forwardly facing plate member for permitting tilting of the blade about the aforesaid horizontal axis while preventing separation of the blade and supporting frame; an arcuate track rigid with the bulldozer blade formed about the horizontal axis and disposed proximate the opposite end of the blade supporting frame; track engaging means on the opposite end of the blade supporting frame for preventing separation of the track and supporting frame while permitting tilting of the blade about said axis; and a hydraulic actuated cylinder and piston assembly disposed in and operable in a vertical plane between the opposite end of the supporting frame and the bulldozer blade for effecting tilting adjustment of the blade relative to the blade supporting frame.

References Cited in the file of this patent

UNITED STATES PATENTS

| | | |
|---|---|---|
| 2,108,466 | Allin | Feb. 15, 1938 |
| 2,308,535 | Paulsen | Jan. 19, 1943 |
| 2,452,408 | Washbond | Oct. 26, 1948 |
| 2,557,160 | Thierry | June 19, 1951 |
| 2,681,518 | Troop | June 22, 1954 |
| 2,731,283 | Weischel | Jan. 17, 1956 |
| 2,749,630 | Nave | June 12, 1956 |
| 2,827,717 | Duke | Mar. 25, 1958 |
| 2,839,848 | Mackey | June 24, 1958 |